United States Patent [19]
Kato et al.

[11] Patent Number: 4,661,373
[45] Date of Patent: Apr. 28, 1987

[54] DISPERSION ELECTROLUMINESCENT ELEMENT

[75] Inventors: Yoshinori Kato; Masami Igarashi; Yoshimi Kamijo, all of Furukawa, Japan

[73] Assignee: Alps Electric Co., Ltd., Japan

[21] Appl. No.: 816,948

[22] Filed: Jan. 6, 1986

Related U.S. Application Data

[63] Continuation of Ser. No. 660,506, Oct. 12, 1984, abandoned.

[30] Foreign Application Priority Data

Oct. 13, 1983 [JP] Japan .................................. 58-189845

[51] Int. Cl.⁴ .......................... B44D 1/18; B05D 5/06; B05D 5/12
[52] U.S. Cl. .......................... 427/66; 427/71; 427/217; 428/690; 428/691; 428/917; 313/503; 313/505; 313/509
[58] Field of Search .......................... 427/66, 71, 217; 428/690, 691, 917, 403; 313/503, 505, 509

[56] References Cited

U.S. PATENT DOCUMENTS

| | | | |
|---|---|---|---|
| 2,310,852 | 2/1943 | Leverenz | 428/690 X |
| 2,675,331 | 4/1954 | Cusano et al. | 428/690 X |
| 2,866,878 | 12/1958 | Briggs et al. | 428/690 |
| 3,775,173 | 11/1973 | Yamamoto et al. | 427/71 |
| 4,376,145 | 3/1983 | Frame | 428/690 X |
| 4,415,471 | 11/1983 | Degenhardt | 428/691 X |
| 4,486,499 | 12/1984 | Morimoto | 428/690 X |
| 4,500,173 | 2/1985 | Leibowitz et al. | 428/917 X |

*Primary Examiner*—Nancy Swisher
*Attorney, Agent, or Firm*—Guy W. Shoup

[57] ABSTRACT

A dispersion electroluminescence element comprising a fluorescent powder layer which is formed on a transparent electrode by coating process and a counter electrode facing said transparent electrode with said fluorescent powder layer interposed therebetween, characterized in that the fluorescent particles in the fluorescent material layer are coated with copper after forming the layer on the transparent electrode and then laminating the counter electrode thereon.

9 Claims, 5 Drawing Figures

Fig. 1
PRIOR ART
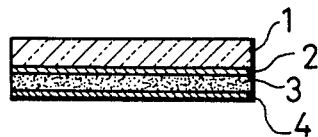
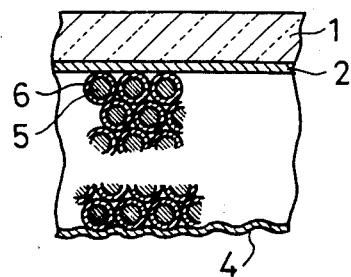
Fig. 2
PRIOR ART
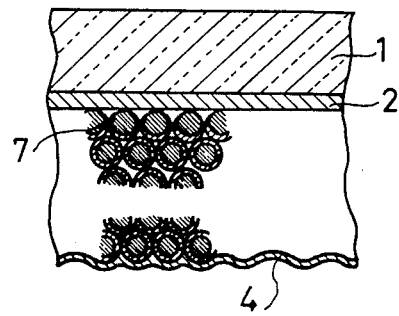
Fig. 3
PRIOR ART
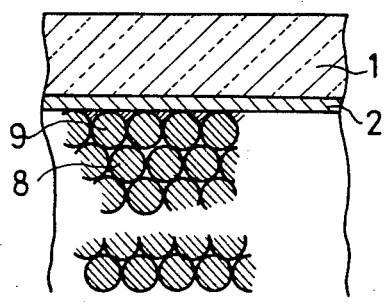
Fig. 4
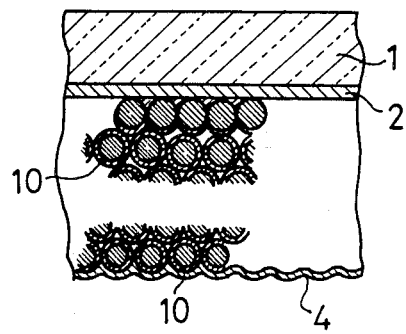
Fig. 5

DISPERSION ELECTROLUMINESCENT ELEMENT

This is a continuation application from application Ser. No. 660,506, filed Oct. 12, 1984, now abandoned.

FIELD OF THE INVENTION

This invention relates to an electroluminescence element (hereinafter, is referred to as EL element) which emits light upon the application of DC, AC or pulse voltage.

BACKGROUND OF THE INVENTION

An EL element composed of a fluorescent material layer prepared by coating a transparent electrode with a fluorescent powder of zinc sulfide activated by the addition of manganese and copper, the surface of which is coated with copper or copper sulfide, dispersed in an appropriate binder and drying has long been investigated by Vechtin England. Because of its high luminance and ease of production, such an EL element has attracted the attention of the industry from the standpoint of practical value. It is known that upon the appplication of a DC voltage in the initial condition after the preparation, this EL element allows the passage of current which first increases with time and then decreases with increasing luminance. Such a phenomenon is known as "forming phenomenon." After the forming phenomenon ends, the EL element begins to show stable emission characteristics. Despite its numerous advantages, this EL element as one practical problem that since the forming step generally needs a few hours to tens of hours and the initial stage of the forming step allows the passage of a large amount of current as 50 to 100 mA/cm$^2$, a consideration must be given to how fast and efficiently the forming step is executed. It is known that the higher the temperature of the fluorescent material layer during the forming is, the faster progresses the forming. As pointed out by Alder and others, however, above 105° C., an irreversible change takes place in the fluorescent material layer which has an adverse effect on the life of the element. Therefore, the temperature of the fluorescent material layer during the forming step cannot be too high.

In this forming step, the copper covering the fluorescent material in the transparent electrode is dispersed toward the counter electrode to form a high resistance layer of less copper concentration in the fluorescent layer in the extreme vicinity of the transparent electrode. Thus, this high resistance layer is a luminous layer. Accordingly, the key to the efficient forming is how efficiently the high resistance layer is formed.

SUMMARY OF THE INVENTION

This invention has been achieved from this standpoint of view. That is, in this invention, a fluorescent material layer without being coated with copper is first formed on a transparent electrode and thereafter is coated with copper so that a layer of less copper concentration is formed in the fluorescent material layer at the vicinity of the transparent electrode prior to the performance of the forming, whereby the forming is efficiently performed or the luminescence is achieved without forming. Thus, this invention is very efficient for practical use.

In addition, the term "copper coating" used in this invention includes not only a coating which always exists as a coating of literal metallic copper but also a coating of copper sulfide resulting from the combination with remaining ions.

BRIEF DESCRIPTION OF THE DRAWINGS

FIG. 1 is a sectional view of a conventional EL element before being subjected to the forming, FIG. 2 is an enlarged view of an essential part of FIG. 1, FIG. 3 is an enlarged view of the essential part of FIG. 1 after forming, FIG. 4 is an enlarged view of an essential part of a fluorescent material layer formed according to this invention, and FIG. 5 is an enlarged view of an essential part of a finished EL element of this invention.

DETAILED DESCRIPTION OF THE INVENTION

Now, the invention is further illustrated with the reference of the drawings.

FIG. 1 shows a sectional view of an EL element prepared by a conventional method. On a glass substrate 1 having formed on the surface thereof a transparent electrode 2 is formed a fluorescent powder layer 3, which shows a forming phenomenon, bound with a binder. The layer 3 has a counter electrode 4 of, for example, aluminum laminated thereon. FIG. 2 is a schematic enlarged view of FIG. 1. Referring to FIG. 2, fluorescent particles 5 are coated with a copper or copper sulfide layer 6. When a DC voltage is applied to the element of FIG. 2 with the transparent electrode 2 and the counter electrode 4 connected to the positive electrode and the negative electrode of a power supply, respectively, the copper covering the fluorescent particles in the transparent electrode begins to be dispersed toward the counter electrode, whereby a high resistance portion 7 of less copper concentration is formed in the vicinity of the transparent electrode as shown in FIG. 3. The portion 7 is adapted to emit light. This step is a so-called "forming."

According to the present invention, unlike the conventional method as shown in FIG. 2, the present method comprises forming on a glass substrate having a transparent electrode formed thereon a fluorescent material layer of fluorescent particles 8 which are not coated with copper but contain only an activator of manganese and copper with the aid of a binding agent, as shown in FIG. 4. In forming the fluorescent material layer, an excess amount of the binding agent is used so that the binding agent 9 in excess of the amount required to bind the particles is gathered toward the transparent electrode 2.

When the fluorescent material layer thus formed is immersed in a solution of copper ions such as aqueous solution of copper chloride (II), copper 10 is deposited on the surface of the fluorescent particles. However, the nearer to the transparent electrode, the deeper in the binding agent the fluorescent particles 8 are embedded, as shown in FIG. 5. Therefore, the fluorescent particles 8 in closer vicinity of the transparent electrode tend not to be coated with copper or to be coated, if any, with much less copper than near the counter electrode 4.

Accordingly, the EL element of the invention prepared by laminating the opposite electrode 4 on the fluorescent material layer thus formed has a state similar to that of the conventional EL element after being subjected to the forming treatment because it has a high resistance luminous layer formed therein before being subjected to the forming treatment. Thus, the EL element of the invention takes less or no time for the forming treatment to have luminescence characteristics. As has been described, the present invention is extremely effective in practical use. This invention will be further illustrated in the following example:

EXAMPLE

Zinc sulfide powder containing 0.5% of manganese and 0.05% of copper as activators was calcined at a temperature of 900° to 950° C. in an atmosphere of nitrogen or hydrogen sulfide for 1 hour to prepare a fluorescent powder. The fluorescent powder thus prepared was dispersed into an ethyl cellulose/terpineol binder of the proportion of the former to the latter of 1:20. The dispersion was applied to a glass substrate having a transparent electrode rested thereon by silk screen printing process. After allowed to stand so that the excess binder was gathered toward the transparent electrode, the element was dried so that the thickness of the dried film reached 15 to 30 μm. The fluorescent material layer thus formed on the substrate was immersed in a 0.1% aqueous solution of copper chloride (II), withdrawn therefrom, washed with pure water several times, and then allowed to dry. The dried fluorescent material layer was coated with aluminum as a counter electrode by vacuum deposition process to finish the EL element. Table 1 shows the forming time (the time required until the stable luminous state is reached) of the EL elements measured with their transparent electrodes and counter electrodes connected to the positive and negative electrodes of a power supply, respectively, and their luminous states. In this table, the proportion of the binder and the fluorescent powder for the formation of the fluorescent material layer and the time of immersion in the aqueous solution of copper chloride (II) are varied. For reference, the results are shown also of the EL element prepared according to the conventional method, i.e. by forming a fluorescent material layer after fluorescent particles are coated with copper.

TABLE 1

|  | EL element of the invention |  |  |  |  |  | EL element of the conventional method |
|---|---|---|---|---|---|---|---|
|  | Example A |  |  | Example B |  |  |  |
| Binder/fluorescent material | 1/1 |  |  | 1.6/1 |  |  | 1/1 |
| Immersion time (min.) | 3 | 5 | 7 | 3 | 5 | 7 | — |
| Forming time (hr.) | 14 | 17 | 18 | <0.1 | <0.1 | 2 | 20 |

As has been described above, the present invention provides a novel preparation method by which a dispersion EL element which emits light upon the application of a DC, AC or pulse voltage can be finished in a shorter time of forming, which has so far remained much to be desired in the production process, or can be finished with no forming treatment to obtain luminescence characteristics. Thus, this invention has a notable effect on the mass production of EL elements of this type for practical use.

What is claimed is:

1. In a method for forming a dispersion electroluminescent element of the type comprising a transparent electrode, a fluorescent powder layer coated on said transparent electrode, and a counter electrode spaced apart from said transparent electrode by said fluorescent powder layer, the improvement comprising the steps of first forming the fluorescent powder layer by suspending the fluorescent particles of said fluorescent powder layer in a binder with an excess amount of binder being provided as a binder layer in the vicinity of said transparent electrode, then immersing the fluorescent particles suspended in the binder in a copper solution such that the particles are coated with copper to a lesser extent on their sides facing toward said transparent electrode due to the excess binder layer in the vicinity of said transparent electrode than toward said counter electrode, whereby the resultant electroluminescent element is formed with much less or no copper coating on the sides of the fluorescent particles facing the transparent electrode and a subsequent copper diffusion forming step can be minimized or avoided.

2. The method for forming a dispersion electroluminescence element according to claim 1, wherein said fluorescent material layer is formed by calcining zinc sulfide powder containing 0.5% of manganese and 0.05% of copper as activators at a temperature of 900° to 950° C. in an atmosphere of nitrogen or hydrogen sulfide for 1 hour, dispersing the powder into a binder in excess of the amount required to bind the particles, applying the dispersion to the transparent electrode, and then drying the element after it is allowed to stand so that the excess binder is gathered toward the transparent electrode.

3. The method for forming a dispersion electroluminescence element according to claim 1, wherein said binder comprises ethyl cellulose and terpineol in the proportion of the former to the latter of 1:20.

4. The method for forming a dispersion electroluminescence element according to claim 2, wherein said drying is conducted so that the thickness of the dried film reaches 15 to 30 μm.

5. The method for forming a dispersion electroluminescence element according to claim 1, wherein the formation of copper coat is executed by immersing the fluorescent material layer in a 0.1% aqueous solution of copper chloride (II), withdrawing the layer therefrom, washing the layer with pure water several times, and then allowing the layer to dry.

6. The method for forming a dispersion electroluminescence element according to claim 5, wherein the time of immersion of the fluorescent material layer in the aqueous solution of copper chloride (II) is within 3 minutes.

7. The method for forming a dispersion electroluminescence element accoding to claim 1, wherein the counter electrode is formed by by vacuum-depositing aluminum on the fluorescent material layer.

8. The method for forming a dispersion electroluminescence element according to claim 1, wherein the mixing ratio of the binder to the fluorescent material is 1.6/1 or more.

9. A dispersion electroluminescent element formed by the method of claim 1.

* * * * *